United States Patent
Sakamoto et al.

(10) Patent No.: US 6,752,451 B2
(45) Date of Patent: Jun. 22, 2004

(54) STRENGTHENING MEMBER FOR AUTOMOBILE

(75) Inventors: Shinya Sakamoto, Kimitsu (JP); Daigo Sumimoto, Kimitsu (JP); Yoshio Terada, Kimitsu (JP); Yukihisa Kuriyama, Futtsu (JP); Hiroshi Sakurai, Chigasaki (JP); Eizaburou Nakanishi, Yokohama (JP)

(73) Assignees: Nippon Steel Corporation, Tokyo (JP); Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/311,518

(22) PCT Filed: Mar. 27, 2002

(86) PCT No.: PCT/JP02/03015
§ 371 (c)(1),
(2), (4) Date: Dec. 13, 2002

(87) PCT Pub. No.: WO02/076809
PCT Pub. Date: Oct. 3, 2002

(65) Prior Publication Data
US 2003/0151273 A1 Aug. 14, 2003

(30) Foreign Application Priority Data
Mar. 27, 2001 (JP) .......................... 2001-089080

(51) Int. Cl.[7] .......................... B21D 47/02; B21D 11/08
(52) U.S. Cl. .............................. 296/187.03; 29/897.2; 72/61; 72/167; 72/370.23
(58) Field of Search ................. 296/146.6, 187.01, 296/187.03, 187.08, 187.09; 29/897.2, 897.3, 897.33; 72/61, 167, 168, 370.22, 370.23

(56) References Cited

U.S. PATENT DOCUMENTS

| | | | | |
|---|---|---|---|---|
| 2,205,893 A | * | 6/1940 | Unger | 72/370.2 |
| 3,209,432 A | * | 10/1965 | Cape | 29/897.2 |
| 4,829,803 A | * | 5/1989 | Cudini | 72/370.22 |
| 4,981,005 A | * | 1/1991 | McGinnis | 52/732.3 |
| 5,557,961 A | * | 9/1996 | Ni et al. | 72/61 |
| 5,794,398 A | * | 8/1998 | Kaehler et al. | 52/653.2 |
| 5,857,734 A | * | 1/1999 | Okamura et al. | 296/187.12 |
| 6,151,940 A | * | 11/2000 | Amborn et al. | 72/62 |

FOREIGN PATENT DOCUMENTS

| | | | | |
|---|---|---|---|---|
| JP | 5-293535 | | 11/1993 | |
| JP | 06-312215 A | * | 11/1994 | 72/370.23 |
| JP | 8-337183 | | 12/1996 | |
| JP | 11-235986 | | 8/1999 | |

* cited by examiner

Primary Examiner—D. Glenn Dayoan
Assistant Examiner—Paul Chenevert
(74) Attorney, Agent, or Firm—Kenyon & Kenyon

(57) ABSTRACT

An object of the present invention is to provide a lightweight strengthening member for an automobile, excellent in crush resistance in the axial direction and having high flexural strength. Further, another object thereof is to provide a strengthening member which does not generating cracks even when a high-strength steel sheet is used. The present invention provides: a strengthening member 1 for an automobile, being a lengthy strengthening member 1 having concave portions 3 at the four corners of a basic rectangular cross section 2 and forming a cruciform closed section as a whole, characterized in that the wall thickness of the concave portions 3 is 5 to 30% thicker than the wall thickness of the portions excluding the concave portions, namely, the side walls 4 and the top walls 5; further, a strengthening member 1 for an automobile, characterized in that the hardness of the concave portions 3 is 5% or more higher than the hardness of the portions excluding the concave portions, namely, the side walls 4 and the top walls 5; and furthermore, a strengthening member 1 for an automobile formed by drawing or hydroforming.

8 Claims, 7 Drawing Sheets

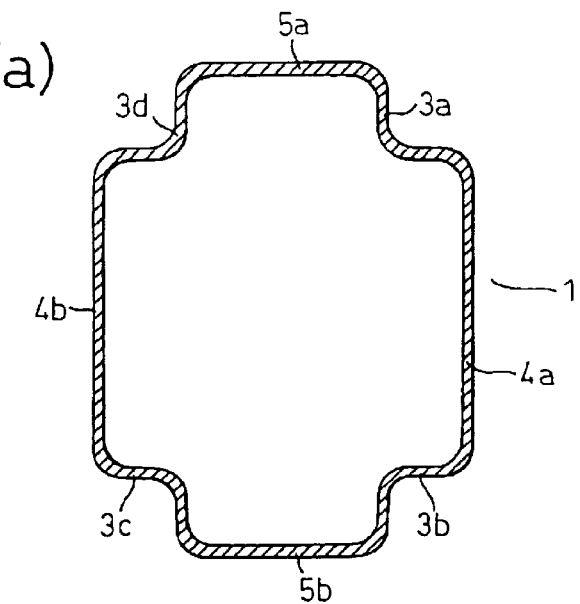
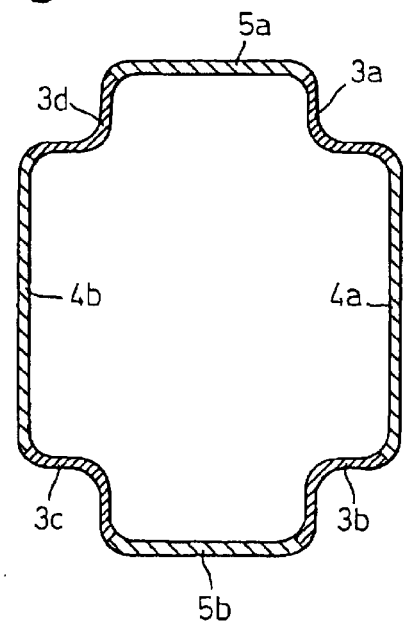
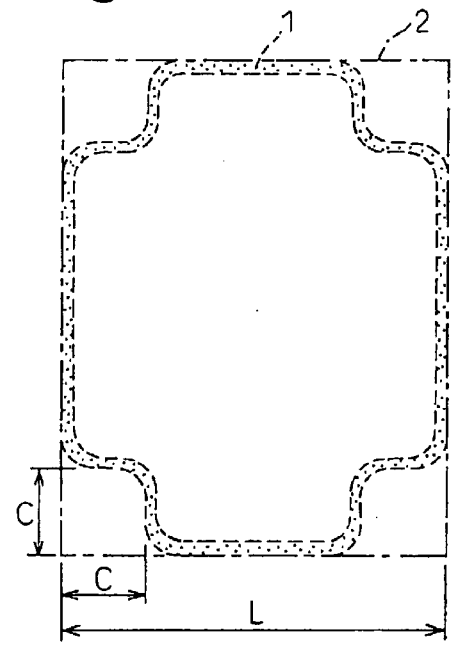

WALL THICKNESS MEASURING POSITION IN CIRCUMFERENTIAL WALL

HARDNESS MEASURING POSITION IN CIRCUMFERENTIAL WALL

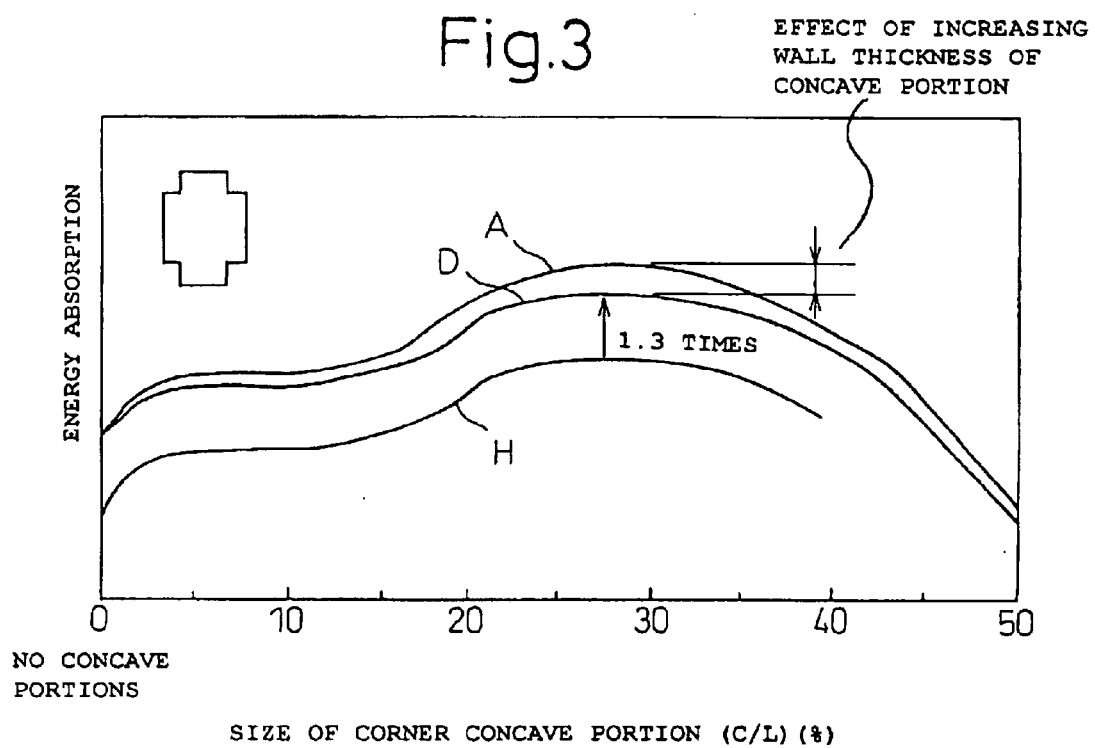

WALL THICKNESS MEASURING POSITION IN CIRCUMFERENTIAL WALL

HARDNESS MEASURING POSITION IN CIRCUMFERENTIAL WALL

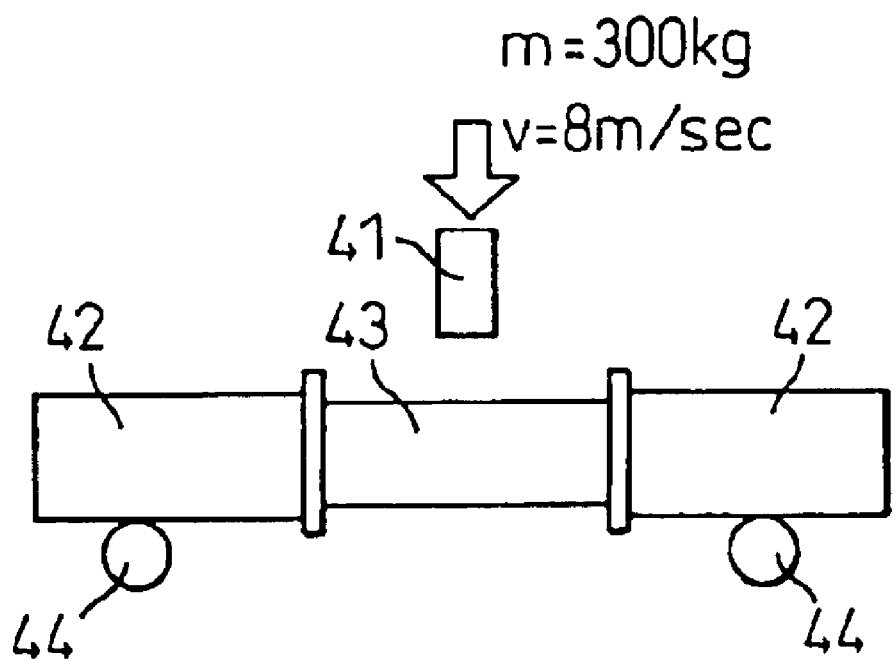

STRENGTHENING MEMBER FOR AUTOMOBILE

TECHNICAL FIELD

The present invention relates to a strengthening member for an automobile used for a front side member, a rear side member, a cross member, a side sill or the like of an automobile.

BACKGROUND ART

In the engine room located at the front part of an automobile, front side members are disposed as strengthening members on the left and right sides in the axial direction so as to extend in the fore-and-aft direction of the car body. When a compressive load is exerted on the front side members at the time of head-on collision of a vehicle, the front side members crush in the longitudinal direction, thereby absorbing the energy of the collision. On the other hand, in the event that the front part of an automobile suffers a collision from the lateral direction, the collision energy is absorbed by the bending deformation of a front side member. Likewise, rear side members are disposed at the rear part of an automobile and side sills to a body, as strengthening members.

Such strengthening members for an automobile are required to have the properties of increasing the amount of energy absorption while minimizing the mass per unit length and also being hardly bendable even when an offset load is exerted thereon. As a strengthening member for an automobile having such properties, Japanese Unexamined Patent Publication No. H8-337183 discloses a strengthening member of a lengthy structure obtained by forming steel sheets into a closed section for sustaining a compressive load in the longitudinal axial direction, wherein the closed section is cruciform and has twelve corner portions and four U-shaped portions forming an angle of 90° with each other, and each of the U-shaped portions has two side walls and a top wall between the side walls. By forming such a shape, it has been made possible to increase the amount of energy absorption and to obtain a hardly bendable strengthening member without increasing the weight of the member. The strengthening member disclosed in the Publication is composed of two steel sheets divided into left and right portions at the center line of the top and bottom U-shaped portions in the cross section, each of the steel sheets being formed by press forming so as to contain a U-shaped portion in the cross section.

DISCLOSURE OF THE INVENTION

For reducing the weight of a car body while securing collision safety, a strengthening member such as a side member has further been required to reduce the weight (to reduce mass per unit length) and to increase the amount of energy absorption, that is, to improve the crush resistance in the axial direction and to enhance the flexural strength.

In addition, when a high-strength steel sheet is used in forming a strengthening member by a conventional press forming, there has been a problem of being apt to generate cracks at the concave portions of the corners and, as a result, being hardly formable.

An object of the present invention is to provide a lightweight strengthening member for an automobile, excellent in crush resistance in the axial direction and having high flexural strength. Another object of the present invention is to provide a strengthening member which does not generate cracks during forming even when a high-strength steel sheet is used.

The present inventors found that, in a lengthy strengthening member 1 having concave portions 3 at the four corners of a basic rectangular cross section 2 and forming a cruciform closed section as a whole, energy absorption amount could be increased and flexural strength could be enhanced even though the mass per unit length of the member was not increased by making the wall thickness of the corner concave portions 3 thicker than that of the portions excluding the concave portions or by making the hardness of the concave portions 3 harder than that of the portions excluding the concave portions. It is preferable to increase the wall thickness of the concave portions 3 and the hardness thereof at the same time. Further, the present inventors found that the desirable distributions of the above-mentioned wall thickness and hardness could easily be obtained when a strengthening member 1 was formed by drawing or hydroforming.

The present invention has been developed based on the above findings and the gist of the present invention is as follows:

(1) A strengthening member for an automobile, being a lengthy strengthening member 1 having concave portions 3 at the four corners of a basic rectangular cross section 2 and forming a cruciform closed section as a whole, characterized in that the ratio (C/L) of the length (C) of said concave portions 3 to the length (L) of the shorter sides of said basic rectangle 2 is in the range from 0.05 to 0.45 and the strengthening member is formed by drawing or hydroforming.

(2) A strengthening member for an automobile, being a lengthy strengthening member 1 having concave portions 3 at the four corners of a basic rectangular cross section 2 and forming a cruciform closed section as a whole, characterized in that the wall thickness of said concave portions 3 is 5 to 30% thicker than the wall thickness of the portions excluding the concave portions, namely, the side walls 4 and the top walls 5.

(3) A strengthening member for an automobile, being a lengthy strengthening member 1 having concave portions 3 at the four corners of a basic rectangular cross section 2 and forming a cruciform closed section as a whole, characterized in that the hardness of said concave portions 3 is 5% or more higher than the hardness of the portions excluding the concave portions, namely, the side walls 4 and the top walls 5.

(4) A strengthening member for an automobile according to the item (2) or (3), characterized by being formed by drawing.

(5) A strengthening member for an automobile according to the item (1), characterized in that the wall thickness of two sides facing each other in said cruciform closed section is 5 to 30% thicker than the wall thickness of the other two sides facing each other.

(6) A strengthening member for an automobile according to any one of the items (1) to (5), characterized in that the ratio (C/L) of the length (C) of said concave portions 3 to the length (L) of the shorter sides of said basic rectangle 2 is in the range from 0.2 to 0.35.

In a lengthy strengthening member 1 having concave portions 3 at the four corners of a basic rectangular cross section 2 and forming a cruciform closed section as a whole, when said strengthening member is formed by the press forming of steel sheets as described in the above-mentioned Japanese Unexamined Patent Publication No. H8337183, the wall thickness tends to decrease at the concave portions of the corners in the closed section. In addition, it is difficult to enhance the hardness of the concave portions selectively by work hardening. On the other hand, a strengthening member according to the present invention, wherein the wall thickness of the concave portions is made thicker than that of the portions excluding the concave portions or the hardness of the concave portions is made harder than that of the portions excluding the concave portions, can remarkably improve crush resistance in the axial direction and flexural strength compared with a strengthening member described in the above-mentioned Japanese Unexamined Patent Publication No. H8-337183.

In addition, even when a high-strength steel sheet is used for forming a strengthening member for an automobile, such cracks as observed in the case of press working can be avoided by applying drawing or hydroforming as disclosed in the present invention instead of press working, and thus it has become possible to provide a strengthening member for an automobile made of a high-strength steel sheet.

BRIEF DESCRIPTION OF THE DRAWINGS

FIG. 1 consists of schematic views explaining the cross-sectional shape of a strengthening member according to the present invention.

FIG. 3 is a graph showing the relation between the shape of corner concave portions and the amount of energy absorption with respect to a strengthening member according to the present invention.

FIG. 6 is a schematic view showing the method of a dynamic bending test used for the present invention.

FIG. 7 is a graph showing the resultant average reactive force, and FIG. 8 a graph showing the resultant energy absorption amount.

BEST MODE FOR CARRYING OUT THE INVENTION

Figure 2A:
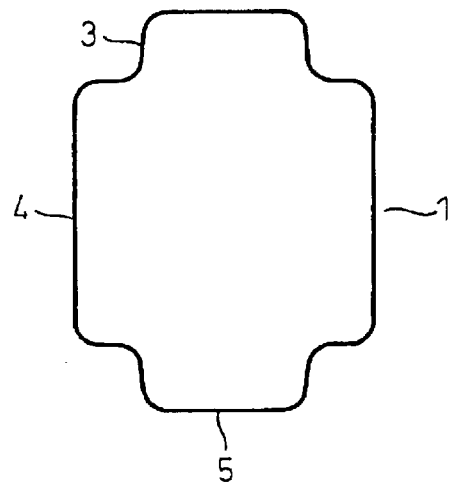
FIG. 2(a) is the cross-sectional view.

A strengthening member for an automobile according to the present invention is long in shape, and, as shown in FIG. 1(a), has concave portions 3 at the four corners of a basic rectangular cross section 2 and forms a cruciform closed section as a whole. FIG. 1(b) indicates the positions of the concave portions 3, the side walls 4 and the top walls 5 by differently hatching each of them. FIG. 1(c) explains what a basic rectangular cross section 2 means. By forming such a shape, the number of corner portions, which absorb collision energy most on the occasion of a crush in the axial direction, amounts to twelve, thus making it possible to increase the energy absorption amount on the occasion of a crush in the axial direction. Moreover, the strengthening member has a well-balanced sectional shape forming a cruciform as a whole, and thus has a hardly bendable structure. Further, the strengthening member has four corner concave portions 3 forming an angle of 90° with each other in the cruciform cross section, and therefore a stable crush mode can be obtained.

In the cross-sectional shape of a strengthening member 1 according to the present invention, portions excluding the concave portions 3 are composed of two pairs of walls, a pair of walls facing each other. Out of the two pairs, a pair of the walls is called side walls 4 and the other pair of the walls is called top walls 5. When the basic rectangle 2 is an oblong, the longer sides thereof are usually called side walls 4.

It is desirable that the ratio (C/L) of the length (C) of said concave portions 3 to the length (L) of the shorter sides of said basic rectangle 2 is in the range from 0.05 to 0.45 as stated in the item (1) of the gist of the present invention. This is because, if C/L is less than 0.05, the concave portions 3 are too small to sufficiently exhibit the effect of providing the concave portions 3, and if it exceeds 0.45, the structural strength inherent in the basic rectangular cross section 2 can not be exhibited. It is more desirable that the ratio (C/L) is in the range from 0.2 to 0.35 as stated in the item (6) of the gist of the present invention. This is because, when the ratio falls within this range, the structural strength inherent in the basic rectangular cross section 2 is sufficiently exhibited and the effect of providing the concave portions 3 can be exercised to the maximum on the increase of the energy absorption amount.

According to the present invention, properties such as crush resistance in the axial direction can be improved even though the mass per unit length of a member is not increased by making the wall thickness of the concave portions 3 thicker than that of the portions excluding the concave portions, namely, the side walls 4 and the top walls 5. It is preferable that the wall thickness of the concave portions 3 is 5 to 30% thicker than that of the portions excluding the concave portions, namely, the side walls 4 and the top walls 5, as stated in the item (2) of the gist of the present invention. This is because, if the thickness of the concave portions is less than 5% thicker than that of the portions excluding the concave portions, the effect of the thickness increase can not be exhibited sufficiently, and if the thickness of the concave portions is more than 30% thicker than that of the portions excluding the concave portions, the effect of the thickness increase is not enhanced but an adverse effect of increasing weight is observed instead.

According to the present invention, properties such as crush resistance in the axial direction can be improved even though the mass per unit length of a member is not increased by making the hardness of the concave portions 3 harder than that of the portions excluding the concave portions, namely, the side walls 4 and the top walls 5. It is preferable that the hardness of the concave portions 3 is 5% or more higher than that of the portions excluding the concave portions, namely, the side walls 4 and the top walls 5 as stated in the item (3) of the gist of the present invention. This is because, if the hardness of the concave portions 3 is less than 5% higher than that of the portions excluding the concave portions, the effect of the hardness increase can not be exhibited sufficiently. On the other hand, no upper limit is specifically determined because any problem due to the excessive hardness of the concave portions 3 does not arise when the hardness of the concave portions 3 is increased by work hardening.

According to the present invention, properties such as crush resistance in the axial direction can further be improved by making the wall thickness of the concave portions 3 thicker than that of the portions excluding the concave portions, namely, the side walls 4 and the top walls 5 and, at the same time, by making the hardness of the concave portions 3 harder than that of the portions excluding the concave portions, namely, the side walls 4 and the top walls 5.

As a means of making the wall thickness of the concave portions 3 thicker than that of the portions excluding the concave portions and also making the hardness of the concave portions 3 harder than that of the portions excluding the concave portions, it is preferable to use a means of forming by drawing as stated in the item (4) of the gist of the present invention. When a lengthy strengthening member having a cross-sectional shape according to the present invention is formed by drawing, usually, a steel pipe having a prescribed material quality and wall thickness is used as the material and the strengthening member is formed by drawing the steel pipe through a gap between a die and a plug. By appropriately selecting the shapes of the die and plug, the pipe can be formed into a shape having concave portions 3 at the four corners of a basic rectangular cross section 2 and forming a cruciform closed section as a whole, and also can have the wall thickness of concave portions 3 thicker than that of the portions excluding the concave portions. Further, by causing work-hardening to take place in the process of drawing especially at portions to be formed into the concave portions 3 in the final shape, the hardness of the concave portions 3 can be made harder than the portions excluding the concave portions.

Likewise, by hydroforming too, the wall thickness of the concave portions can be made thicker than that of the portions excluding the concave portions, and further the hardness of the concave portions can be made harder than that of the portions excluding the concave portions. In the hydroforming, the final shape of a strengthening member is obtained by preparing a die assembly for forming, adjusting the internal shape of the die assembly so as to be equal to the external shape of the strengthening member, disposing a material pipe in the die assembly, filling the interior of the material pipe with a liquid, pressurizing the liquid in the material pipe while exerting compressive force on both ends of the material pipe, and thus plastically deforming the material pipe.

Since, according to the item (1) of the gist of the present invention, the wall thickness of concave portions 3 can be made thicker than that of the portions excluding the concave portions and further the hardness of the concave portions 3 can be made harder than that of the portions excluding the concave portions by forming a strengthening member by drawing or hydroforming, good properties in actual crush resistance and the like can be obtained by the present invention. Further, even when the wall thickness or hardness of the concave portions is not increased further than that of the portions excluding the concave portions, in a case where a strengthening member is formed by drawing or hydroforming, the strength is enhanced by the work hardening of the whole strengthening member and therefore the energy absorption amount and flexural strength can be increased, compared with a case where it is formed by bending work such as a conventional press working.

The strength against a bending exerted on a strengthening member of the present invention mounted in an automobile is also important in order for a car body to have a good rigidity. When, among the walls of a strengthening member, the top walls 5 are disposed so as to face the lateral side of the automobile and the side walls 4 are disposed so as to form an angle of 90° with the top walls 5, the deformation of the strengthening member when subjected to a bending from the lateral directions is often initiated by the buckling of the side walls 4. The item (5) of the gist of the present invention has been invented by paying attention to this point, and is characterized in that the wall thickness of two sides facing each other in the cruciform closed section is 5 to 30% thicker than that of the other two sides facing each other. In this event, the thicker sides are used as the side walls 4. Then, the bending force is received by the top walls 5. Since the thickness of the side walls is adequate, the rigidity against a bending exerted on the top walls can sufficiently be secured. On the other hand, the thickness of the top walls is made thinner than the thickness of the side walls, which is effective in reducing the mass per unit length of a strengthening member. When a bending is exerted from the top wall direction, since the deformation does not develop by the buckling of the top walls, the rigidity against a bending from the top wall direction is not lowered even when the thickness of the top walls is made thinner. If the difference in thickness between the top walls and the side walls is less than 5%, a sufficient effect can not be exhibited. On the other hand, if the difference in thickness exceeds 30%, the excessively large thickness of the side walls increases the mass of the strengthening member, or the excessively small thickness of the top walls deteriorates the crush resistance in the axial direction, and therefore that is not desirable. According to the invention of the item (5), the thickness of the side walls is thicker than the thickness of the top walls. With respect to the thickness of concave portions, if the thickness of the concave portions is thicker than the thickness of the top walls, the effect of enhancing the crush resistance in the present invention can be exhibited and, therefore, the effect of the present invention can be exercised even if the thickness of the side walls is the same as the thickness of the concave portions.

EXAMPLES

Example 1

Figure 2B:
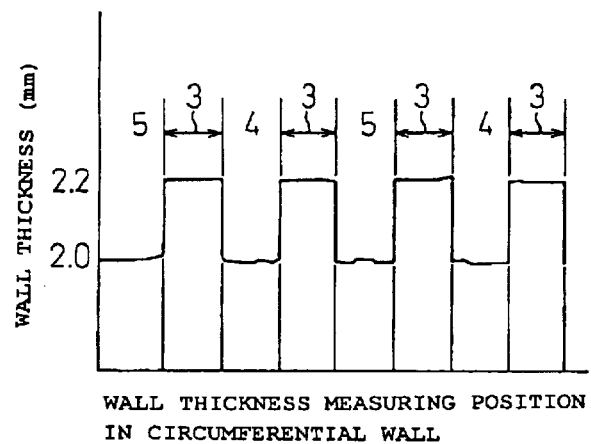
FIG. 2(b) is a graph showing the distribution of the wall thickness in the circumferential direction, and FIG. 2(c) a graph showing the distribution of the hardness in the circumferential direction.
Figure 2C:
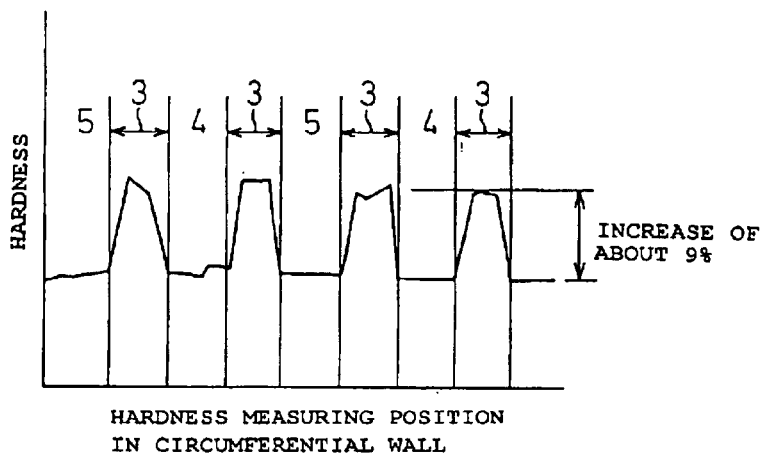
FIG. 2 shows a strengthening member according to the present invention.

The first example according to the present invention is a strengthening member having a basic rectangular cross section 100 mm×75 mm in size and forming a cruciform closed section as a whole, and its cross-sectional shape is shown in FIG. 2(a). Concave portions 3 15 mm×15 mm in size are provided at the four corners of the basic rectangular cross section. A steel pipe of 590 MPa class is used as a material pipe and formed into the above-mentioned shape by drawing. The forming is carried out so that the wall thickness of only the concave portions 3 may be increased and the minimum wall thickness may not fall below 2 mm over the entire circumferential length of the cross section. The distribution of the wall thickness in the circumferential direction of the cross section is as shown in FIG. 2(b). That is, a member not less than 2.0 mm in wall thickness is obtained; the wall thickness of the top wall portions 5 is 2.0 mm, that of the concave portions 3 2.2 mm, and that of the side wall portions 4 2.0 mm. Further, the distribution of hardness in the circumferential direction of the cross section is shown in FIG. 2(c). The hardness of the concave portions 3, whose wall thickness is increased, is increased to be about 9% higher than that of the side walls 4 and the top walls 5.

Samples are cut out from the strengthening member thus manufactured, and are subjected to an axial impact crush test. The energy absorption amount is calculated from the reactive force and the deformation displacement of the member at each moment when an impact is exerted thereon.

Then, another test is carried out by changing the concave length (C) so that the ratio (C/L) of the length (C) of the concave portions 3 to the length (L) of the shorter sides of the basic rectangular cross section 2 may vary from 0 to 50%. The results are shown in FIG. 3. In FIG. 3, the reference character A indicates an example according to the present invention and this example is manufactured under the same conditions as the above example with the exception of the ratio (C/L). The reference character D in FIG. 3 indicates an example manufactured so that the wall thickness of the concave portions 3 may be 2.0 mm, the same as that of the side wall portions 4 and the top wall portions 5, while the working method, etc. are identical to the example A. The reference character H in FIG. 3 indicates a comparative example, which is formed by bending a steel sheet of the same strength as the examples A and D, having the same basic rectangular cross section and the same shape of concave portions as the examples A and D, and having the wall thickness of the side wall portions 4 and the top wall portions 5 being 2.0 mm, the same as the examples A and D.

The samples A, D and H are subjected to the axial impact crush test. In FIG. 3, the abscissas indicate C/L in percentage and the ordinates indicate energy absorption amount. The energy absorption amount is measured in the same manner as described above. It is observed that the energy absorption amount increases more in the range where C/L is not less than 0.05 than in the cases where no concaves exist, and it is understood that especially good results are obtained in the range where C/L is 0.2 to 0.35. No such effect is observed in the range where C/L exceeds 0.45.

The energy absorption amount of the example D, which is formed by drawing, is 1.3 times that of the comparative example H, which is formed by bending. In a comparison between the examples formed identically by drawing, the energy absorption amount of the example A, which has an increased wall thickness at the concave portions, increases more than that of the example D, which has not-increased wall thickness at the concave portions.

In FIG. 3, even in the cases where the C/L is zero, that is, even in the cases where no concave portions exist, the energy absorption amount of the examples A and D, which are formed by drawing, is higher than the comparative example H, which is formed by bending. The reason is that, even in the side walls 4 and the top walls 5, the strength is enhanced by work-hardening more in the case of forming by drawing than in the case of forming by bending.

Example 2

Figure 4A:
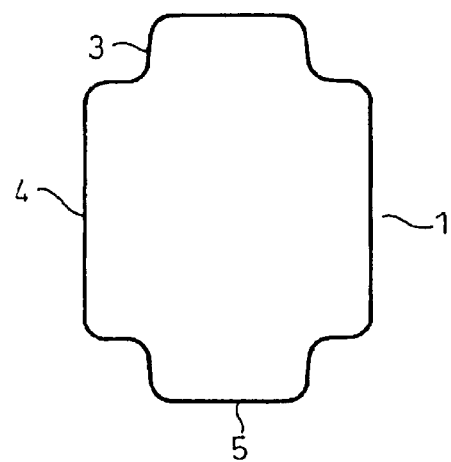
FIG. 4(a) is the cross-sectional view.
Figure 4B:
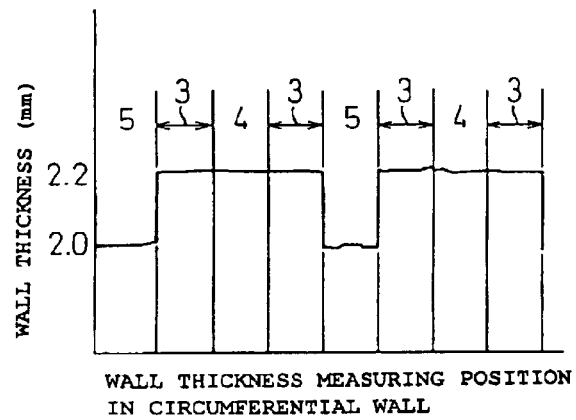
FIG. 4(b) is a graph showing the distribution of the wall thickness in the circumferential direction, and FIG. 4(c) a graph showing the distribution of the hardness in the circumferential direction.
Figure 4C:
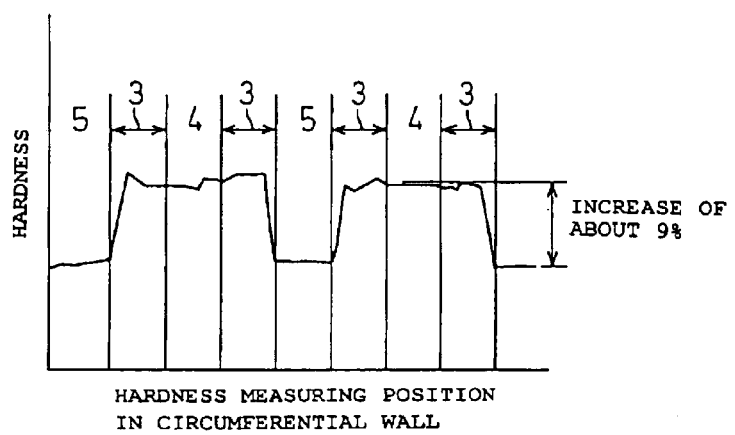
FIG. 4 shows another strengthening member according to the present invention.

The second example is shown in FIG. 4. The basic rectangular cross section 2 is 100 mm×75 mm in size, which is identical to the first example. The cross-sectional shape is as shown in FIG. 4(a), and has concave portions 3 15 mm×15 mm in size at the four corners of the basic rectangular cross section 2. A steel pipe of 590 MPa class is used as a material pipe and formed into the above-mentioned shape by drawing. The forming is carried out so that the wall thickness of the concave portions 3 and the side wall portions 4 may increase and the minimum wall thickness may not fall below 2 mm over the entire circumferential length except the portions where the wall thickness increases. The distribution of the wall thickness in the circumferential direction of the cross section is as shown in FIG. 4(b). That is, a member having the minimum wall thickness of not less than 2.0 mm and the increased wall thickness at both the side wall portions 4 and the concave portions 3 is obtained; the wall thickness of the top wall portions 5 is 2.0 mm, that of the concave portions 3 2.2 mm, and that of the side wall portions 4 2.2 mm. Further, the distribution of the hardness in the circumferential direction of the cross section is shown in FIG. 4(c). The hardness of the concave portions 3 and the side wall portions 4, whose wall thickness is increased, is increased to be about 9% higher than that of the top wall portions 5.

Example 3

The third example according to the present invention, which is formed by hydroforming, is shown in FIG. 5. FIG. 5(a) shows the cross section of a 590 MPa class material pipe 21 102 mm in diameter and 2 mm in wall thickness. The material pipe 21 is given concave curvatures, each of which is reverse to the convex curvature of a circle, by roll forming, and is formed into a pipe 22 having a shape shown in FIG. 5(b).

Figure 5A:
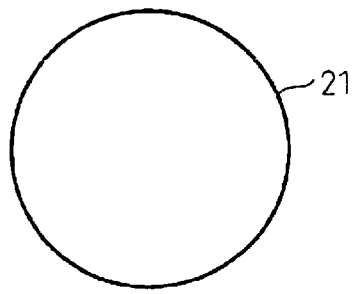
FIG. 5(a) is a cross-sectional view of a material pipe, FIG. 5(b) a cross-sectional view of the pipe after it is roll-formed, FIG. 5(c) a cross-sectional view showing a situation after the pipe is put in a hydroforming die assembly, FIG. 5(d) a cross-sectional view showing a situation where the pipe is being subjected to hydroforming, FIG. 5(e) a cross-sectional view showing a situation where compressive force is applied to the walls in the course of hydroforming, and FIG. 5(f) a cross-sectional view of a formed strengthening member.
Figure 5B:
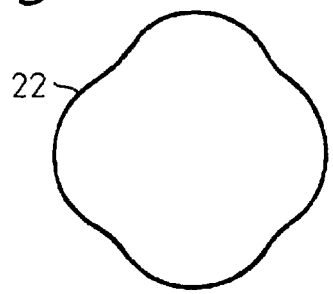
FIG. 5 consists of schematic views explaining a method of forming a strengthening member by hydroforming.
Figure 5C:
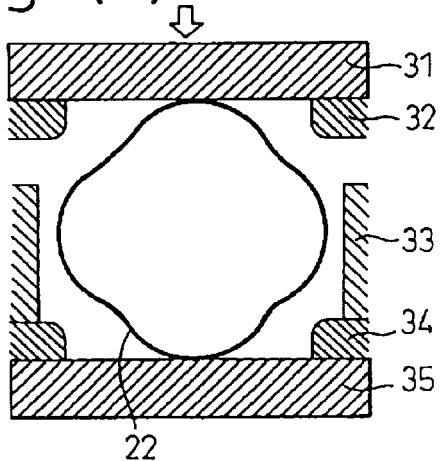
Figure 5D:
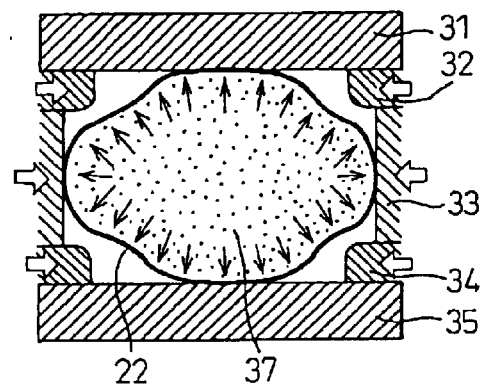
Figure 5E:
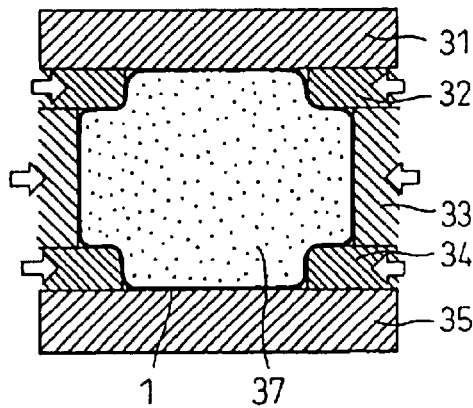

Thereafter, the pipe 22 is formed by hydroforming as shown in FIGS. 5(c) to 5(e). That is to say, the interior of the pipe 22 is filled with a liquid 37, and the pipe 22 is formed with a die assembly while applying a liquid pressure of about 5 MPa in the pipe 22 when the material pipe 21 is a 590 MPa class pipe having a wall thickness of 2 mm. In this event, if there is no anxiety of buckling in the pressurized surfaces, the interior of the pipe may not be filled with the liquid 37.

Figure 5F:
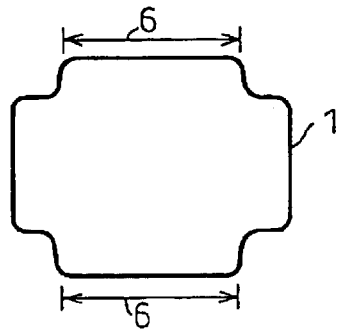

To begin with, the pipe 22 is disposed in the hydroforming die assembly as shown in FIG. 5(c), and the assembly is compressed so as to narrow the distance between the upper die 31 and the lower die 35, thereby forming the pipe into the shape shown in FIG. 5(d). Then, the material pipe is expanded as shown in FIG. 5(e) by increasing the liquid pressure while adding a compressive force to both ends of the material pipe. At the same time, the movable upper dies 32 and the movable lower dies 34 are actuated to perform die clamping. Finally, a member having a shape shown in FIG. 5(f) is obtained. On this occasion, when the pipe is of 590 MPa class and has a wall thickness of 2 mm, an initial liquid pressure of 10 to 15 MPa can be applied thereto, and a leak valve can be used to adjust the increase of the liquid pressure in the pipe accompanying the volume decrease caused by the die clamping. The liquid pressure in the pipe is controlled so as to increase with the increase of compressive force acting on the side wall portions and is increased up to about 40 MPa. By so doing, it is made possible to increase the wall thickness of the concave portions 3 by about 10% over the initial wall thickness and, at the same time, to increase the wall thickness of the side walls 4 by about 10% over the initial wall thickness, and thus it is made possible to form the walls 6 having the increased wall thickness.

The impact flexural strength of the strengthening members prepared in Examples 1 and 2 is evaluated. As comparative materials, the steel materials of the same strength as Examples are used, and the press-formed double-hat structures having the same basic rectangular cross sections and concave portions as Examples are employed. In order to make the mass per unit length of strengthening members different from each other, several kinds of materials varying the wall thickness are used for both Examples and the comparative examples.

A test member 43 is cut out in the length of 300 mm from a strengthening member 1, and steel materials acting as rigid bodies 42 are welded to both ends of the test member 43 to prepare a structure 900 mm in length. The structure is supported by two supports 44 at an inter-support distance of 700 mm and is subjected to an impact three-point bending test. The impact bending test is carried out under the condition that a striker 41 50 mm in width is used and made collide with a top wall of the test member 43 at a collision speed of 8 m/s (FIG. 6).

Figure 7:
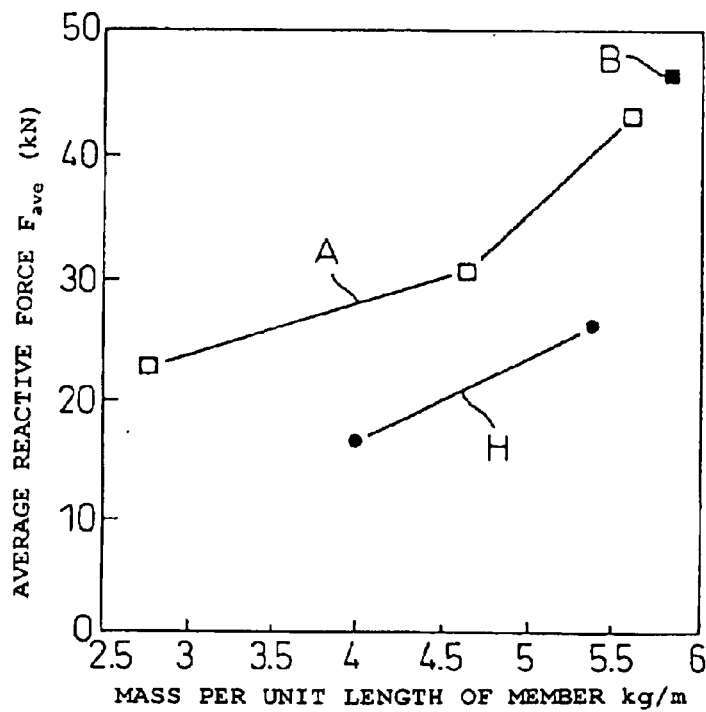
FIG. 7 and FIG. 8 consist of graphs showing the effects of the present invention in dynamic three-point bending deformation.
Figure 8:
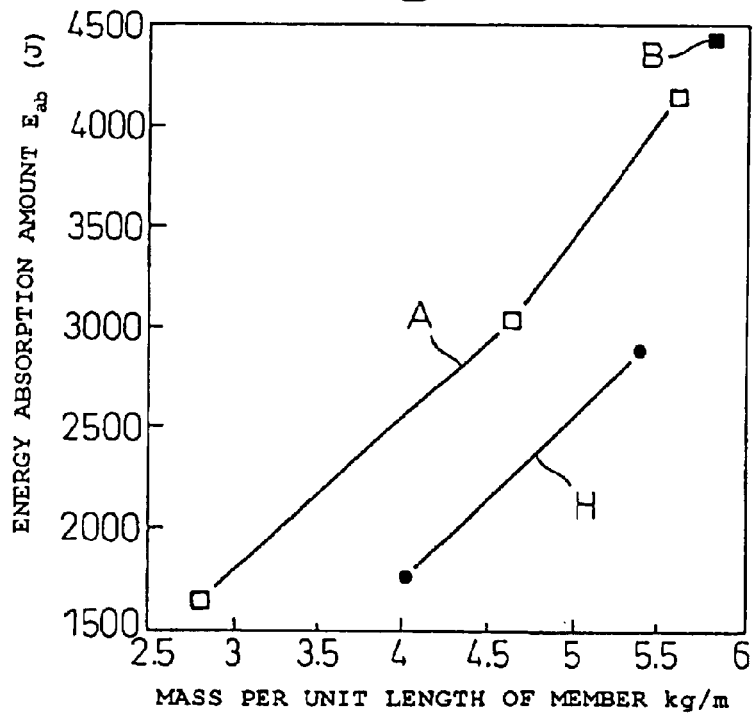

The results of the test are shown in FIG. 7 and FIG. 8. In the figure, the reference characters A, B, and H designate Example 1, Example 2, and the comparative example, respectively. In both FIGS. 7 and 8, the abscissas indicate the mass per unit length (kg/m) of the strengthening members. In FIG. 7, the ordinates indicate the average reactive force $F_{avo}$ (kN). It is found that the average reactive force of Example 1(A) increases by 35% or more over the comparative example H on condition that the mass per unit length is identical. Example 2(B) shows a better result than Example 1(A). In FIG. 8, the ordinates indicate the energy absorption amount $E_{ab}$. It is found that the energy absorption amount of Example 1(A) increases by 18% or more over the comparative example H on condition that the mass per unit length is identical. Example 2(B) shows a better result than Example 1(A).

As stated above, it is found that the use of a strengthening member according to the present invention not only provides an increase in energy absorption by axial impact crush but also provides an increase in strength and an increase in energy absorption by bending deformation.

INDUSTRIAL APPLICABILITY

In a lengthy strengthening member having concave portions at the four corners of a basic rectangular cross section and forming a cruciform closed section as a whole, the energy absorption amount can be increased and flexural strength can be enhanced on condition that the mass per unit length of the member is not increased, by making the wall thickness of the corner concave portions thicker than that of the portions excluding the concave portions, or by making the hardness of the concave portions harder than that of the portions excluding the concave portions. The flexural strength can be far more enhanced by making the wall thickness of two sides facing each other in the cruciform thicker than the wall thickness of the other two sides facing each other.

By forming a strengthening member by drawing or hydroforming, the above preferable wall thickness and hardness distributions can be easily obtained, and even if the wall thickness or hardness of the concave portions is equal to that of the portions excluding the concave portions, higher strength can be realized.

When a strengthening member for an automobile is formed of a high-strength steel sheet, by using drawing or hydroforming, a strengthening member not generating cracks can be produced.

What is claimed is:

1. A strengthening member for an automobile, being a lengthy strengthening member having concave portions at the four corners of a basic rectangular cross section and forming a cruciform closed section as a whole, characterized in that the wall thickness of said concave portions is 5 to 30% thicker than the wall thickness of the portions excluding the concave portions, namely, the side walls and the top walls.

2. A strengthening member for an automobile according to claim 1, characterized by being formed by drawing.

3. A strengthening member for an automobile according to claim 1, characterized in that a ratio (C/L) of the length (C) of said concave portions to the length (L) of the shorter sides of said basic rectangle is in the range from 0.2 to 0.35.

4. A strengthening member for an automobile, being a lengthy strengthening member having concave portions at the four corners of a basic rectangular cross section and forming a cruciform closed section as a whole, characterized in that the hardness of said concave portions is 5% or more higher than the hardness of the portions excluding the concave portions, namely, the side walls and the top walls.

5. A strengthening member for an automobile according to claim 4, characterized by being formed by drawing.

6. A strengthening member for an automobile according to claim 4, characterized in that a ratio (C/L) of the length (C) of said concave portions to the length (L) of the shorter sides of said basic rectangle is in the range from 0.2 to 0.35.

7. A strengthening member for an automobile, being a lengthy strengthening member having concave portions at the four corners of a basic rectangular cross section and forming a cruciform closed section as a whole, characterized in that:

a ratio (C/L) of the length (C) of said concave portions to the length (L) of the shorter sides of said basic rectangle is in the range of 0.05 to 0.45;

the wall thickness of two sides facing each other in said cruciform closed section is 5 to 30% thicker than the wall thickness of the other two sides facing each other; and the strengthening member is formed by drawing or hydroforming.

8. A strengthening member for an automobile according to claim 7, characterized in that the ratio (C/L) of the length (C) of said concave portions to the length (L) of the shorter sides of said basic rectangle is in the range from 0.2 to 0.35.

* * * * *